United States Patent [19]

Cooley

[11] 3,845,406

[45] Oct. 29, 1974

[54] LASER GLASS HOST COMPOSITIONS COMPRISING TEO$_2$, BAO AND PBO

[75] Inventor: Richard F. Cooley, Toledo, Ohio

[73] Assignee: Owens-Illinois, Inc., Toledo, Ohio

[22] Filed: June 27, 1973

[21] Appl. No.: 373,923

[52] U.S. Cl.................... 331/94.5 E, 252/301.4 R, 252/301.4 F, 106/47 Q
[51] Int. Cl......... H01s 3/00, C03c 3/12, C03c 3/30
[58] Field of Search ...................... 106/47 Q, 47 R; 331/94.5 E; 252/301.4 R, 301.4 F; 301.6 R

[56] References Cited
UNITED STATES PATENTS
3,423,326   1/1969   Redman ...................... 252/301.6 R FOREIGN PATENTS OR APPLICATIONS
736,073    8/1955   Great Britain .................... 106/47 Q
741,986   12/1955   Great Britain .................... 106/47 Q
1,496,561  9/1972   Germany .......................... 106/47 Q

OTHER PUBLICATIONS

Stanworth, "Tellurite Glasses," J. Soc. Glass Tech., vol. 36, (1952), pp. 217–241, TP845 S 678.

*Primary Examiner*—Winston A. Douglas
*Assistant Examiner*—Mark Bell
*Attorney, Agent, or Firm*—Richard D. Heberling; E. J. Holler

[57] ABSTRACT

Laser glass host compositions for effective lasing amounts of Nd$_2$O$_3$ are disclosed, the host compositions comprising TeO$_2$, BaO and PbO in certain molar proportions. Also disclosed are methods of making highly effective laser articles, such as rods and discs, and the new use of the above-described TeO$_2$/BaO/-PbO glass compositions for forming laser articles, the new use including forming a laser article from the compositions; pumping the laser article to provide an energy inversion; and lasing the pumped article.

6 Claims, 1 Drawing Figure

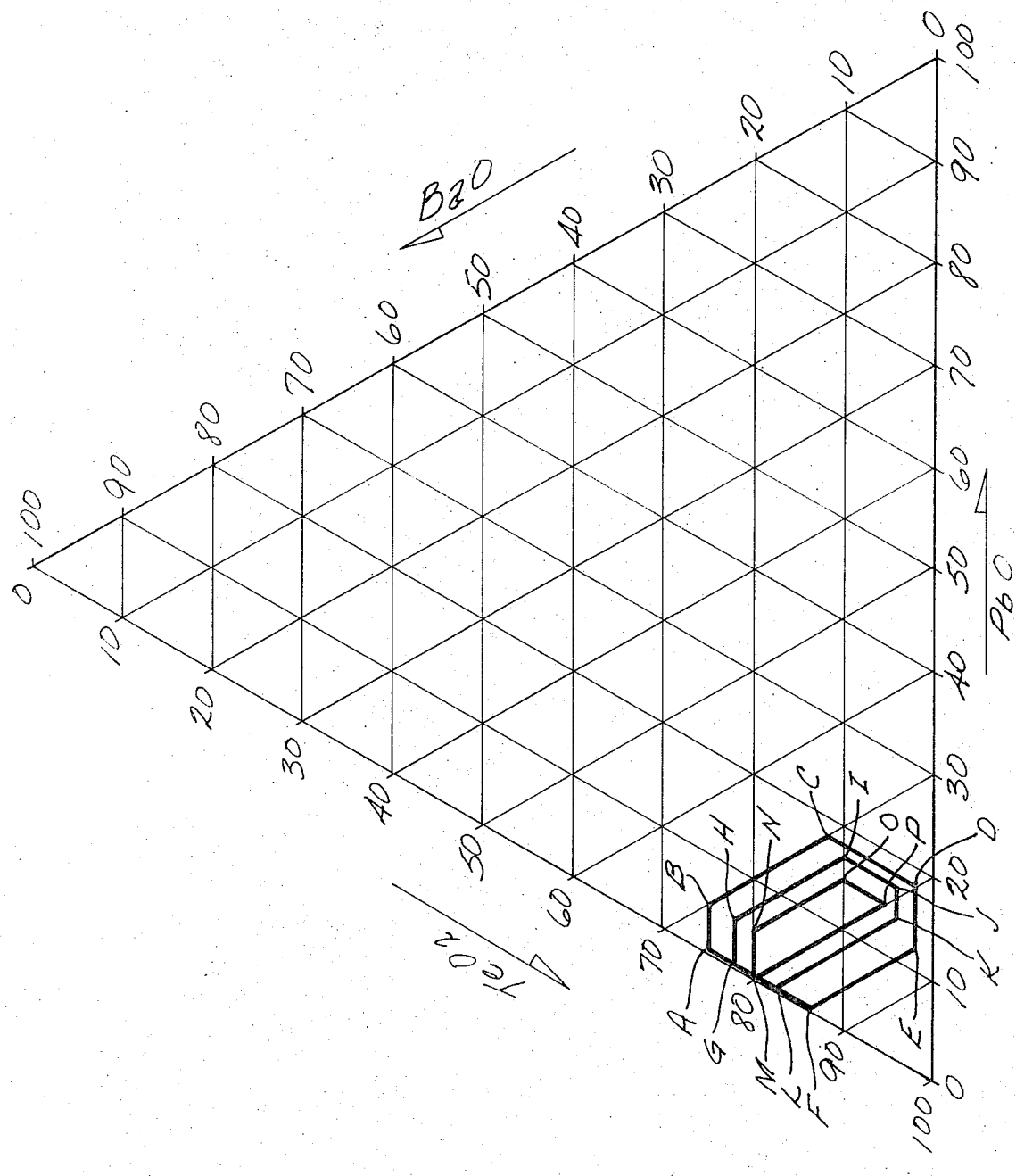

ized by the drawings, in which the FIGURE is a ternary diagram of the glass host composition of the present invention in which the molar proportions of $TeO_2$, BaO and PbO are defined by the areas within the heavy lines of the ternary diagram.

LASER GLASS HOST COMPOSITIONS COMPRISING $TEO_2$, BAO AND PBO

INVENTION

The present invention relates to glass host compositions for effective lasing amounts of $Nd_2O_3$, the host compositions comprising $TeO_2$, BaO and PbO in certain molar amounts. The present invention also relates to methods of making highly efficient laser articles from the above-described glass compositions. The present invention also relates to the new use of a $TeO_2$/BaO/PbO glass composition for making glass laser articles, the new use including making the laser articles from the compositions, pumping the articles, and lasing the pumped articles.

It is desirable to provide improved laser glass compositions that can be used to make highly efficient glass laser articles, such as rods and discs. It is also desirable to provide methods of making the articles and also to provide the new use for $TeO_2$/BaO/PbO glass compositions for making glass laser articles, the new use including forming a glass laser article from the compositon, pumping the laser article, and lasing the pumped article.

It is an object of the present invention to provide a laser glass composition comprising $TeO_2$, BaO and PbO in which the proportions of $TeO_2$, BaO and PbO in molar amounts are defined in a general range by the area within the heavy lines connecting the points ABCDEF of the ternary diagram of the FIGURE of the drawings, the glass composition being a host for an effective lasing amount of $Nd_2O_3$.

It is an object of the present invention to provide a method for making a glass article in which the method comprises the steps of:

1. melting laser glass batch-forming materials to provide a molten glass comprising $TeO_2$, BaO and PbO in which the molar proportions thereof are defined by the area within the heavy lines connecting the points ABCDEF of the ternary diagram of the FIGURE, the molten glass being a host for an effective lasing amount of $Nd_2O_3$;

2. forming a glass laser blank from the molten glass; and 3. fabricating a laser article from the blank to provide an efficient laser article.

It is an object of the present invention to provide the new use for a glass composition for a glass article in which the glass comprises $TeO_2$, BaO and PbO in certain molar proportions and in which the glass composition is a host for an effective lasing amount of $Nd_2O_3$, the new use comprising the steps of:

1. forming a glass laser article from the glass composition comprising $TeO_2$, BaO and PbO, along with the effective lasing amount of $Nd_2O_3$;

2. pumping the laser article to provide an energy inversion; and 3. lasing the pumped article.

It is an object of the present invention to provide an efficient glass laser article made from a glass composition comprising $TeO_2$, BaO and PbO, and containing an effective lasing amount of $Nd_2O_3$.

These and other objects will be apparent from the specification that follows, the appended claims, and the drawings, in which the FIGURE is a ternary diagram of the glass host composition of the present invention in which the molar proportions of $TeO_2$, BaO and PbO are defined by the areas within the heavy lines of the ternary diagram.

The present invention provides outstanding laser glass host compositions for effective lasing amounts of $Nd_2O_3$, the host compositions comprising $TeO_2$, BaO and PbO in certain molar proportions thereof that are defined in a general range by the area within the heavy lines connecting the points ABCDEF of the ternary diagram of the FIGURE of the drawings.

Preferably, the molar porportions of $TeO_2$, BaO and PbO are defined by the area within the heavy lines connecting the points GHIJKL of the ternary diagram.

The optimum glass host compositions contain molar amounts of $TeO_2$, BaO and PbO that are defined in an optimum range by the area within the heavy lines connecting the points MNOP in the ternary diagram.

The present invention also provides methods for making highly efficient glass laser articles, the methods including the steps of:

1. melting laser glass batch-forming materials to provide a molten glass comprising $TeO_2$, BaO and PbO in which the molar proportions thereof are defined in a general range by the area within the heavy lines connecting the points ABCDEF of the ternary diagram, the molten glass capable of acting as a host for an effective lasing amount of $Nd_2O_3$;

2. forming a glass laser blank from the molten glass; and 3. fabricating the outstanding laser articles from the glass laser blank.

The present invention also provides the new use for a glass composition as a glass laser article in which the glass comprises $TeO_2$, BaO and PbO in certain molar proportions that are defined in a general range within the area formed by the heavy lines connecting the points ABCDEF of the ternary diagram, and in which the glass composition is a host for an effective lasing amount of $Nd_2O_3$, the new use comprising the steps of:

1. forming a glass laser article from the glass composition comprising $TeO_2$, BaO and PbO;

2. pumping the laser article to provide an energy inversion; and 3. passing monochromatic light through the article to provide a stimulated emission at a wavelength of about 1.06 microns.

A zinc tellurite glass consisting essentially of a major molar proportion of $TeO_2$ and between about 20 and 40 molar percent of ZnO is described and claimed in the Redman U.S. Pat. No. 3,423,326. These zinc tellurite glasses were reported as having some fluorescent activity when doped with $Nd_2O_3$.

As previously indicated, the outstanding laser glass host compositions of the present invention unexpectedly exhibit much higher fluorescent activity than the zinc tellurite glasses of U.S. Pat. No. 3,423,326, the increased fluorescent activity indicating a greater laser efficiency for laser articles made from the host compositions of the present invention.

As previously described, only certain molar proportions of $TeO_2$, BaO and PbO can be used to provide the highly efficient laser articles, such as rods and discs. The increase in fluorescent activity of the glasses of the present invention, when compared to the working examples of U.S. Pat. No. 3,423,326, is generally at least about 50 percent and preferably at least about 60 or 70 percent. Often the increase is at least about 100 percent.

In the previously mentioned Redman patent, there is no suggestion of any other glass system other than that of a host composition consisting essentially of zinc oxide and tellurium oxide. Hence, there is no suggestion in the Redman patent that highly efficient laser articles can be made from a laser glass composition containing only certain molar proportions of $TeO_2$, BaO and PbO.

In general, the glass host composition of the present invention contains about 70–86 mole percent $TeO_2$, about 2–25 mole percent BaO, and about 0.2–18 mole percent PbO.

Preferably, the laser glass host compositions comprise about 73–82 mole percent $TeO_2$, about 4–22 mole percent BaO, and about 0.2–17 mole percent PbO.

The most preferred host glass compositions contain about 75–80 mole percent $TeO_2$, about 5–20 mole percent BaO, and about 0.2–15 mole percent PbO. The host compositions of the present invention contain generally about 0.01–1.5 mole percent $Nd_2O_3$ and preferably about 0.3–1.0, and optimally about 0.4–0.9 mole percent $Nd_2O_3$.

Good results have been obtained when the laser glass host composition comprises about 75 mole percent $TeO_2$, about 20 mole percent BaO, and about 5 mole percent PbO or about 75 mole percent $TeO_2$, about 10 mole percent BaO, and about 15 mole percent PbO.

In accordance with the present invention, the increase in fluorescent activity for laser articles for the present invention is surprisingly at least about 50 percent over that of a zinc tellurite glass containing about 65 mole percent $TeO_2$ and 35 mole percent ZnO.

The increase in fluorescent activity is at least about 50 percent greater than that of a lithia-calcia-alumino silicate glass laser composition as set forth in U.S. Pat. No. 3,471,409 to Lee and Rapp, the laser composition comprising the following ingredients in approximate mole percentages:

| Ingredient | Mole Percent |
| --- | --- |
| $SiO_2$ | 60 |
| $Al_2O_3$ | 2.5 |
| $Li_2O$ | 27.5 |
| CaO | 10 |
| $Nd_2O_3$ | 0.5 |

The highest fluorescent intensity value for a zinc tellurite glass containing 35 mole percent ZnO is about 2.09 when compared to the fluorescent intensity value of the above-described lithia-calcia-alumino silicate glass laser, which is the reference glass, arbitrarily designated to be 1.0.

The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

| Ingredients | Mole Percent | | Weight Percent | |
| --- | --- | --- | --- | --- |
| | Host Glass | Laser Article | Host Glass | Laser Article |
| $TeO_2$ | 85.0 | 84.4 | 82.0 | 80.6 |
| BaO | 5.0 | 4.9 | 4.6 | 4.5 |
| PbO | 10.0 | 9.9 | 13.4 | 13.2 |
| $Nd_2O_3$ | — | 0.8 | — | 1.7 |

The slurry was mixed for 10 minutes and poured into a gold crucible. The crucible was placed in an air circulating oven with the temperature maintained at 110°C. overnight to remove the water. The crucible was then placed in an electric resistance furnace with the temperature at 750°C. for 3 hours, or until homogenous, after which the molten glass immediately poured into a preheated (260°C.) graphite mold forming a disc having an 11/16 inch diameter and 1/4 inch thickness. The graphite mold was placed in an annealing oven maintained at 340°C. After 1 hour, at 340°C., the temperature of the annealing oven was lowered at a rate of 38°C. per hour to 250°C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.19.

PART B

The polished glass disc from Part A was tested for fluorescence intensity and decay time in a high power pulsed test system. The disc was placed in a holder and exposed to a beam of light from an EG & G model FX 12-25 xenon flash lamp. The flash lamp had a flash duration of about 20 microseconds. The disc was not observed to solarize after repeated excitation by the flash lamp. The fluorescence intensity and decay time of the excited sample was measured by photographing the oscilloscope display of the 1060 nanometer fluorescent intensity versus time on a Tektronix Model 556, Dual Trace oscilloscope connected to an RCA S-1 photomultiplier, having a narrow band pass filter.

The fluorescence intensity measurement was normalized against ED-2, a glass laser composition of Owens-Illinois, Inc., comprising, in mole percent, 60.0% $SiO_2$, 2.5% $Al_2O_3$, 27.5% $Li_2O$, 10% CaO, 0.16% $CeO_2$ and 0.5% $Nd_2O_3$, disclosed in U.S. Pat. No. 3,471,409, as Example 1. The fluorescence intensity was found to be 3.49 when normalized against the glass laser composition; 3.49 times the intensity of the glass laser composition.

The fluorescence intensity was corrected for the refractive indices of the glass disc and the reference glass laser composition by FI (corrected) = FI (normalized) $[(1.56)^2/(\eta glass\ disc)^2]$ The corrected fluorescence intensity was 1.72. The fluorescence decay time was 140 microseconds.

EXAMPLE 2

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 80.0 | 79.5 | 78.9 | 77.7 |
| BaO | 15.0 | 14.8 | 14.2 | 13.9 |
| PbO | 5.0 | 4.9 | 6.9 | 6.7 |
| $Nd_2O_3$ | — | 0.8 | — | 1.7 |

The refractive index of the finished polished glass disc was measured to be 2.12.

PART B

The polished glass disc from Part A was tested for fluorescence intensity and decay time as described in Part B of Example 1. The normalized fluorescence intensity was 3.7 and the corrected fluorescence intensity was 1.95. The fluorescence decay time was 145 microseconds.

EXAMPLE 3

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 75.0 | 74.5 | 74.2 | 73.0 |
| BaO | 20.0 | 19.8 | 18.9 | 18.6 |
| PbO | 5.0 | 4.9 | 6.9 | 6.7 |
| $Nd_2O_3$ | — | 0.8 | — | 1.7 |

The refractive index of the finished polished glass disc was measured to be 2.09.

PART B

The polished glass disc from Part A was tested for fluorescence intensity and decay time as described in Part B of Example 1. The normalized fluorescence intensity was 4.4 and the corrected fluorescence intensity was 2.39. The fluorescence decay time was 132 microseconds.

EXAMPLE 4

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 80.0 | 79.5 | 75.7 | 74.6 |
| BaO | 5.0 | 4.9 | 4.5 | 4.4 |
| PbO | 15.0 | 14.8 | 19.8 | 19.5 |
| $Nd_2O_3$ | — | 0.8 | — | 1.5 |

The refractive index of the finished polished glass disc was measured to be 2.18.

PART B

The polished glass disc from Part A was tested for fluorescence intensity and decay time as described in Part B of Example 1. The normalized fluorescence intensity was 3.51 and the corrected fluorescence intensity was 1.77. The fluorescence decay time was 140 microseconds.

Other specific glass laser compositions set forth herein as being suitable for use in the present invention can be substituted for the specific glass laser compositions used in the working examples to provide substantially equivalent results. For instance, any of the compositions set forth within the area formed by the heavy lines connecting the points ABCDEF of the ternary diagram can be used in place of any of the specific laser compositions used in the working examples. As previously indicated, any of the glass laser compositions set forth within the area formed by the heavy lines connecting the points GHIJKL of the ternary diagram can be used to provide an increased laser efficiency of at least 50 percent over a zinc tellurite glass containing only tellurium oxide and zinc oxide, as described in the Redman patent or at least 50 percent of the previously-described lithia-calcia-alumino silicate laser glass. In most cases, the increase in fluorescent activity is at least 60 to 70 percent when the composition is within the area formed by the heavy lines connecting the points GHIJKL, or the optimal range of the area formed by the heavy lines connecting the points MNOP. The increase in fluorescent intensity and lasing efficiency is often as high as about 100 percent or more when compared to the working examples of the Redman patent.

What is claimed is:
1. A laser glass composition comprising:
   1. a host glass containing about 70–86 mole percent $TeO_2$, about 2–25 mole percent BaO, and about 0.2–18 mole percent PbO; and
   2. an effective lasing amount of $Nd_2O_3$.
2. A laser glass composition comprising:

1. a host glass containing about 73–82 mole percent $TeO_2$, about 4–22 mole percent BaO, and about 0.2–17 mole percent PbO; and
2. an effective lasing amount of $Nd_2O_3$.

3. A laser glass composition comprising:
1. about 75–80 mole percent $TeO_2$, about 5–20 mole percent BaO, and about 0.2–15 mole percent PbO; and
2. an effective lasing amount of $Nd_2O_3$.

4. A laser glass composition as defined in claim 1 in which the host glass comprises about 75 mole percent $TeO_2$, about 20 mole percent BaO, and about 5 mole percent PbO.

5. A laser glass composition as defined in claim 1 in which the glass host comprises about 75 mole percent $TeO_2$, about 10 mole percent BaO, and about 15 mole percent PbO.

6. The new use for a glass composition as a glass laser article in which the proportions of $TeO_2$, BaO and PbO in molar amounts are defined by the area within the heavy lines connecting the points ABCDEF in the ternary diagram in the FIGURE of the drawings, and in which the glass composition is a host for an effective lasing amount of $Nd_2O_3$, the new use comprising the steps of:
1. forming a laser article from the glass laser composition;
2. pumping the laser article to cause an energy inversion; and
3. passing monochromatic light through the article to cause stimulated emission at a wave length of about 1.06 microns.

* * * * *